United States Patent [19]

May

[11] 4,165,351

[45] Aug. 21, 1979

[54] METHOD OF MANUFACTURING A METAL OXIDE VARISTOR

[75] Inventor: John E. May, Skaneateles, N.Y.

[73] Assignee: General Electric Company, Auburn, N.Y.

[21] Appl. No.: 780,633

[22] Filed: Mar. 23, 1977

Related U.S. Application Data

[63] Continuation of Ser. No. 616,855, Sep. 25, 1975, abandoned.

[51] Int. Cl.$^2$ .............................................. C04B 33/32

[52] U.S. Cl. ...................................... 264/66; 252/518; 252/520; 264/61; 264/234; 264/345

[58] Field of Search ..................... 264/61, 66, 56, 234, 264/345, DIG. 25; 252/518, 520

[56] References Cited

U.S. PATENT DOCUMENTS 3,899,451 8/1975 Ichinose et al. ...................... 252/520

*Primary Examiner*—Robert F. White

*Assistant Examiner*—John A. Parrish

*Attorney, Agent, or Firm*—Robert J. Mooney; Stephen B. Salai

[57] ABSTRACT

Disclosed is a method of manufacturing a metal oxide varistor body. Conventional manufacturing techniques through sintering are utilized on any metal oxide varistor formulation which includes bismuth oxide. Following sintering, the devices are heat treated at a temperature between 750° C. and 1200° C. for a time in excess of about 10 hours. The heat treatment increases the alpha of the devices and substantially lowers the leakage current.

33 Claims, 9 Drawing Figures

METHOD OF MANUFACTURING A METAL OXIDE VARISTOR

This is a continuation of application Ser. No. 616,855, filed Sept. 25, 1975, now abandoned.

BACKGROUND OF THE INVENTION

This invention relates to metal oxide varistors and, more particularly, to a metal oxide varistor with an improved structure which provides more desirable electrical properties and to a method of making the improved varistor.

In general, the current flowing between two spaced points is directly proportional to the potential difference between those points. For most known substances, current conduction therethrough is equal to the applied potential difference divided by a constant, which has been defined by Ohm's law to be the resistance. There are, however, a few substances which exhibit nonlinear resistance. Some devices, such as metal oxide varistors, utilize these substances and require resort to the following equation (1) to quantitatively relate current and voltage:

$$I=(V/C)^{\alpha} \qquad (1)$$

where V is the voltage applied to the device, I is the current flowing through the device, C is a constant and $\alpha$ is an exponent greater than 1. Inasmuch as the value of $\alpha$ determines the degree of nonlinearity exhibited by the device, it is generally desired that $\alpha$ be relatively high. $\alpha$ is calculated according to the following equation (2):

$$\alpha=\log_{10}(I_2/I_1)/\log_{10}(V_2/V_1) \qquad (2)$$

where $V_1$ and $V_2$ are the device voltages at given currents $I_1$ and $I_2$, respectively.

At very low voltages and very high voltages, metal oxide varistors deviate from the characteristics expressed by equation (1) and approach linear resistance characteristics. However, for a very broad useful voltage range the response of metal oxide varistors is as expressed by equation (1).

The values of C and $\alpha$ can be varied by changing the varistor formulation and the manufacturing process.

Another useful varistor characteristic is the varistor voltage which can be defined as the voltage across the device when a given current is flowing through it. It is common to measure varistor voltage at a current of one milliampere and subsequent reference to varistor voltage shall be for voltage so measured.

Still another varistor characteristic of use to circuit designers considering varistors is the leakage current. Realizing that varistors are normally exposed to line voltage during use, it is clear that some current will constantly flow therethrough. This leakage current is wasted and thus it is desirable to minimize it. Also, the leakage current can cause joule heating in the varistor, possibly causing premature device aging or characteristic changes. consequently, it is generally desired to keep the leakage current as low as possible.

The foregoing is, of course, well known in the prior art.

Metal oxide varistors are usually manufactured by mixing a plurality of additives with a powered metal oxide. Usually zinc oxide is used, but it should be realized that other base oxides such as those of titanium, germanium, iron, cobalt, nickel, and vanadium can be used. Typically, four to twelve additives are employed, yet together they comprise only a small portion of the end product, for example, less than five to ten mole percent. In some instances the additives comprise less than one mole percent. The types and amounts of additives employed vary with the properties sought in the varistor. The additives are usually metals, metal oxides, or metal flourides. Copious literature describes metal oxide varistors utilizing various addiombinations. For example, see U.S. Pat. Nos. 3,642,664, 3,663,458, and 3,687,871, or my copending patent application Ser. No. 467,274, filed Nov. 19, 1973, now U.S. Pat. No. 3,878,602 titled, "Metal Oxide Varistor With Discrete Bodies Of Metallic Material Therein And Method For The Manufacture Thereof." A portion of the metal oxide and additive mixture is then pressed into a body of a desired shape and size. Next, the body is sintered for an appropriate time at a suitable temperature as is well known in the prior art. Sintering causes the necessary reactions among the additives and the metal oxide and fuses the mixture into a coherent pellet. Leads are then attached and the device is encapsulated by conventional methods.

Varistors manufactured by the aforementioned techniques function well in most applications. However, as is the case with most electronic components, certain particularly demanding applications require a device with improved characteristics. Specifically, some applications require a varistor with a higher alpha which will clamp more effectively. Other applications require a varistor that will consume less power when in its standby mode. That is, they require a varistor with a lower leakage current.

It is, therefore, an object of this invention to provide a metal oxide varistor with improved electrical properties such as an increased alpha and a lower leakage current, and to provide a method for manufacturing the varistor.

SUMMARY OF THE INVENTION

This invention is characterized by a metal oxide varistor and a method for the manufacture thereof. A granular metal oxide base material, such as zinc oxide, is combined with a plurality of additives in a conventional manner. The additives include bismuth oxide. The resulting mixture is pressed and sintered to form metal oxide varistor bodies, again in the conventional manner. Following sintering, the bodies are heat treated by heating them to an elevated temperature in the range of about 750° C. to about 1200° C. for a time sufficient to cause a substantial reduction in the leakage current and an increase in the varistor alpha. Generally, this time is in excess of 10 hours. Following the heat treatment, the varistors are packaged in the conventional manner.

The metal oxide varistor body is composed of a plurality of grains which consist primarily of the metal oxide base material. The grains are separated by an intergranular region in a cellular configuration. The intergranular region consists primarily of the preselected additives.

Depending on the thermal history of a varistor, the bismuth oxide in the intergranular region can be in any of several phases. It is believed that when the bismuth oxide is primarily in the body centered cubic phase, the leakage current of the device is reduced and the alpha is increased. The aforementioned heat treatment is believed to substantially completely convert the bismuth oxide to the body centered cubic phase.

DESCRIPTION OF THE DRAWINGS

These and other features and objects of the present invention will become more apparent upon a perusal of the following description taken in conjunction with the accompanying drawings wherein.

DESCRIPTION OF THE PREFERRED METHOD

Figure 1:
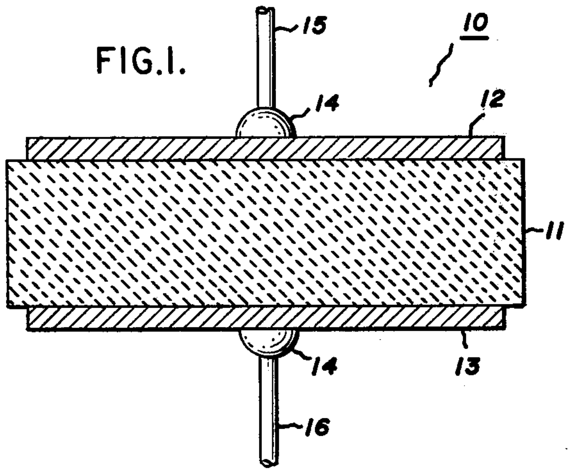
FIG. 1 is a diagrammatic sectional elevation view of a metal oxide varistor.

Before proceeding with a detailed description of the varistors and the manufacturing technique contemplated by this invention, varistor construction will be generally described with reference to FIG. 1. A varistor 10 includes as its active element a sintered body 11 having a pair of electrodes 12 and 13 in ohmic contact with the opposite surfaces thereof. The body 11 is prepared as hereinafter set forth and can be in any form such as circular, square, or rectangular. Wire leads 15 and 16 are conductively attached to the electrodes 12 and 13, respectively, by a connection material 14 such as solder.

In manufacturing the varistor, the base material is thoroughly mixed with a plurality of preselected additives. The additives comprise but a small part of the final mixture which is formed. The additives can be in any of several forms such as oxides, carbonates, fluorides, or metallics. Bismuth oxide must be included among the additives. As is well known in the prior art, the final mixture is pressed and sintered at about 1200° to 1300° C. to form a varistor body. The sintering temperature must, of course, be high enough that a liquid phase is formed so that the body becomes a coherent mass upon cooling.

In a conventional varistor manufacturing process the varistor body is passivated if desired, and contacts are applied following sintering. Finally, the device is encapsulated. The present disclosure, however, contemplates an additional heat treatment for the varistor body prior to encapsulation. The body is heated to a temperature between about 750° C. and 1200° C. for a time sufficient to cause a substantial decrease in the leakage current as compared to a non-heat treated device and a substantial increase in the alpha as compared to a non-heat treated device. Specifically, the time required for this change is in excess of 10 hours. As will be explained more fully below, it is believed that a phase change in which most of the bismuth oxide converts to a body centered cubic form imparts the desirable property improvements to the varistor. As will become more apparent below, the leakage current can easily be decreased by a factor of two or more and the alpha can easily be increased by two or more.

Various options are available when carrying out the heat treatment. For example, the sintering cycle can be modified so that the varistor bodies are held at a selected temperature in the 800° to 1200° range for a sufficient period of time during the cool-down portion of the sintering cycle. Or, inasmuch as certain varistor passivating processes involve firing glass on the varistor bodies at temperatures of about 800° C., the glass firing can be extended for a sufficient period of time and the heat treatment and glassing operations can be combined. Similarly, the heat treatment can be combined with contact metallization if a contact metal is being used that is compatible with the temperatures required for the heat treatment.

Following the heat treatment, the varistor bodies have contacts applied and are encapsulated in the conventional manner.

Figure 2:
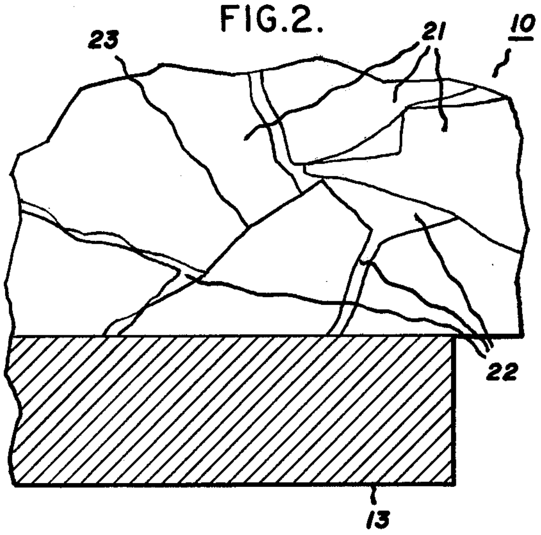
FIG. 2 is a detailed view of a portion of the varistor shown in FIG. 1 showing the grain structure.

Referring now to FIG. 2, there is shown in detail a portion of FIG. 1. The granular structure of the metal oxide varistor body is shown in FIG. 2. A plurality of relatively large grains 21 consists predominately of the metal oxide base material. Separating the grains is a cellular intergranular region 22 which is composed primarily of the preselected additives. As will be observed from FIG. 2, the intergranular region varies substantially in thickness from relatively wide regions to regions so thin that they are illustrated as a single line in FIG. 2. An example of the thin regions is the intergranular region 23.

When observing FIG. 2, it must be realized that the varistor is a three-dimensional structure and thus the intergranular region is really cellular, or like a honeycomb in that it separates the several grains from each other in all dimensions. The thin intergranular regions at the grain boundaries are currently believed responsible for the metal oxide varistor's properties.

Figure 3:
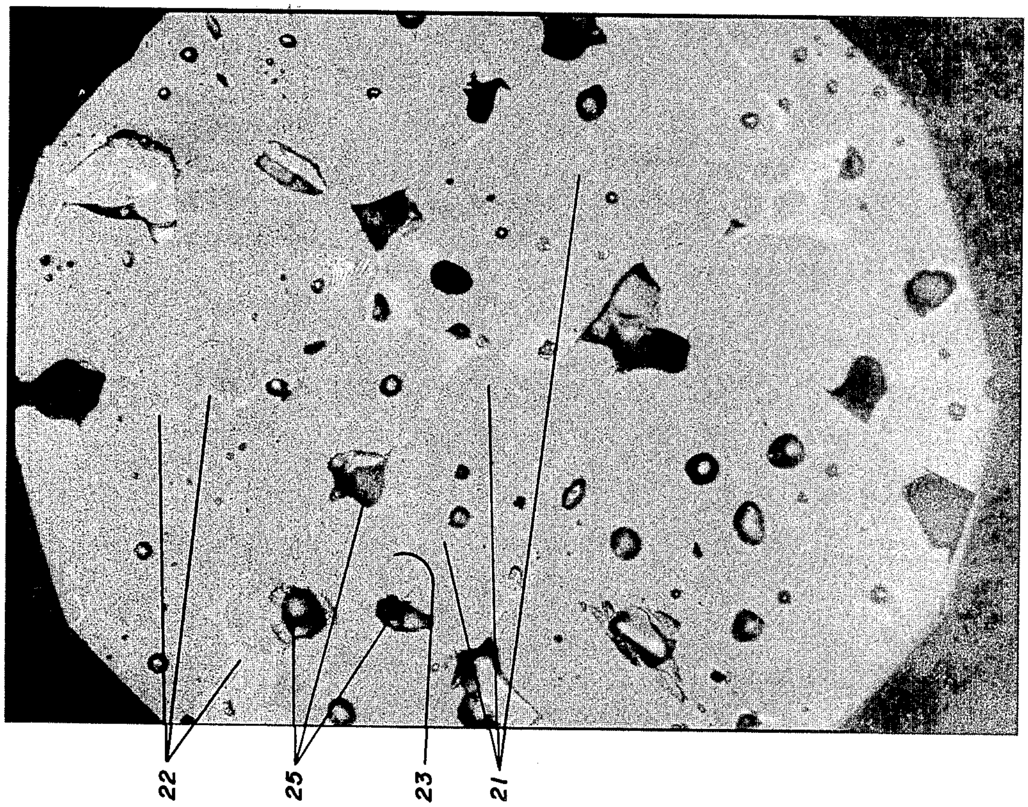
FIG. 3 is a photomicrograph similar to FIG. 2 showing a portion of an actual prior art varistor.

Referring now to FIG. 3, there is an 800 power photomicrograph of a region similar to the region depicted in FIG. 2. The darkest areas 25 in FIG. 3 are voids and various crystal phases and imperfections which were not shown in FIG. 2 and are unimportant to the present discussion. The large regions of a medium gray tone 21 correspond to the grains 21 of FIG. 2. The smaller regions of lighter gray 22 are, of course, the intergranular regions. It wil be observed that certain areas of the intergranular region 23 are exceedingly thin and thus the associated grains are only narrowly separated.

Figure 4:
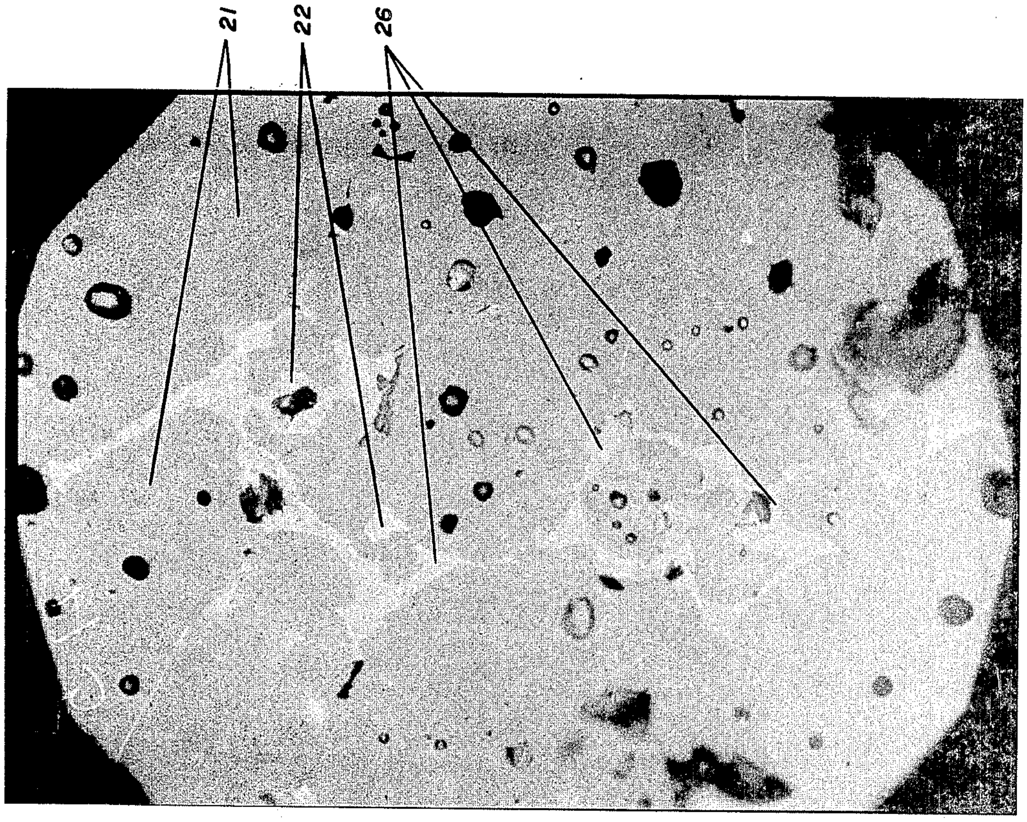
FIG. 4 is a photomicrograph showing a varistor which has received a heat treatment as disclosed herein.

Referring next to FIG. 4, there is a similar photomicrograph, also at 800 power, illustrating the grains 21 and grain boundaries 22. However, in addition to the light gray in the intergranular regions 22, there will be noted small white areas 26. These white areas are believed to be body centered cubic bismuth oxide.

It will be observed that much of the body centered cubic bismuth oxide is coating a substantial portion of the surface of the zinc oxide grains. This is believed significant in view of the belief that it is the intergranular regions near the intersection with the grains that impart to the metal oxide varistor its electrical properties. Thus, it is not surprising that a phase change at the grain boundary could have a substantial affect on those electrical properties.

EXAMPLE 1

Figure 5:
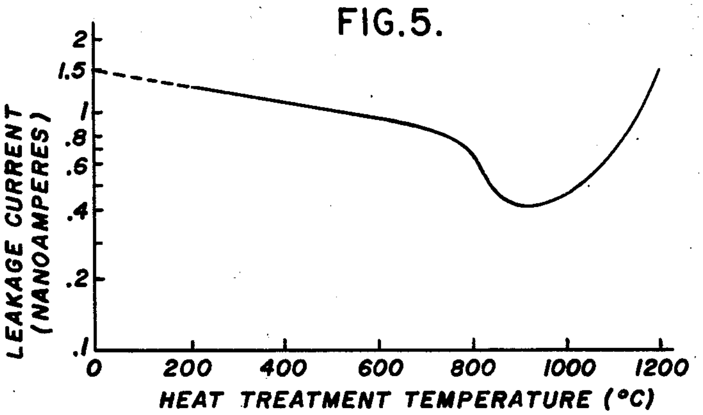
FIG. 5 is a graph illustrating the effect of the heat treatment on the varistor leakage current for one particular varistor formulation.

Referring now to FIG. 5, there is a plot of the leakage current versus the heat treatment temperature. Devices used for generating the data for FIG. 5 were prepared by mixing 96.8 mole percent zinc oxide base material with the following additives:

Bismuth oxide: 0.5 Mole Percent
Managanese oxide: 0.5 Mole Percent
Cobalt oxide: 0.5 Mole Percent
Antimony oxide: 1.0 Mole Percent
Boron oxide: 0.1 Mole Percent
Tin oxide: 0.5 Mole Percent
Barium carbonate: 0.1 Mole Percent The aforementioned constituents were thoroughly mixed, pressed, and sintered at approximately 1300°.

Samples prepared in the aforementioned manner were exposed to different heat treatments and the leakage currents of the resulting devices are indicated in FIG. 5. It will be appreciated from FIG. 5 that a substantial reduction in leakage current is provided by heat treating at a temperature between about 800° C. and 1200° C. The heat treatment must be continued for a time sufficient to cause the reduction in leakage current. Typically, this time is in excess of 10 hours, although the time is believed to be composition dependent.

EXAMPLE 2

Figure 6:
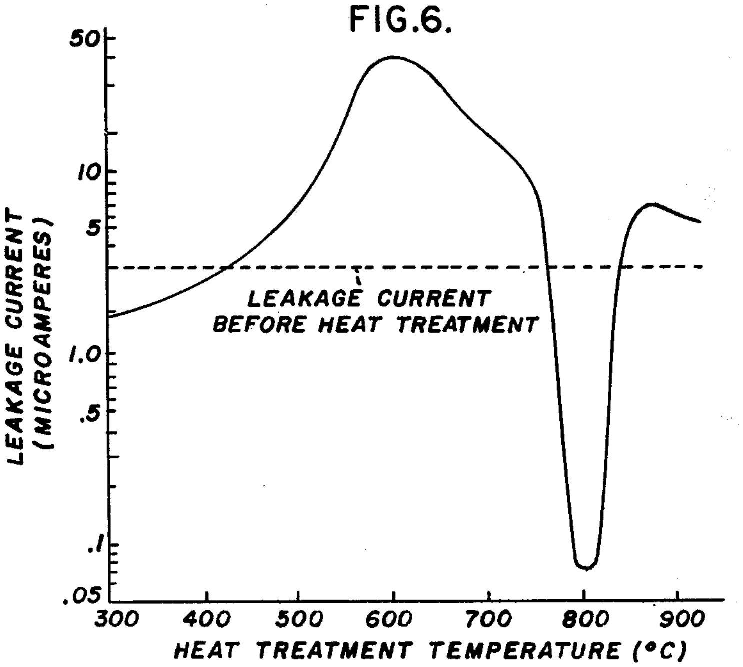
FIG. 6 is another graph illustrating leakage current in a different varistor formulation.

Referring now to FIG. 6, there is shown a graph of leakage current versus heat treatment temperature for a different varistor formulation. The samples used were prepared by combining 97 mole percent zinc oxide with the following additives:

Bismuth oxide: 0.5 Mole percent
Cobalt oxide: 0.5 Mole percent
Titanium oxide: 0.5 Mole percent
Manganese oxide: 1.5 Mole percent The aforementioned additives were prereacted in accordance with the techniques set forth in my copending U.S. Patent Application Ser. No. 401,131, filed Sept. 27, 1973, now U.S. Pat. No. 3,950,274 entitled, "Low Voltage Varistor and Process for Making." The prereacted additives were ground and mixed with the zinc oxide in accordance with the technique taught in my copending application and the resulting final mix was pressed and sintered at about 1300° C. The varistor bodies thus fabricated were subjected to various heat treatments with the results depicted in FIG. 6.

It will be appreciated from an observation of FIG. 6 that a drastic reduction in the leakage current occurs when the samples prepared as described above are heat treated at a temperature between about 750° C. and 850° C.

As has been mentioned previously, it is believed that the change in properties during the heat treatment is due to a phase transformation of the bismuth oxide in the intergranular region. This helps explain the difference between the preferred temperature range of FIG. 5 (800° to 1200° C.) and the preferred temperature range of FIG. 6 (750° to 850° C.). Specifically the composition utilized to make the samples for FIG. 5 contains antimony. It is believed that the antimony increases the temperature required for the bismuth oxide phase transformation to body centered cubic. Also, it will be noted that a more dramatic reduction in leakage current was evident in the devices used to generate the data for FIG. 6. It is believed that the titanium which is present in those devices stabilizes the body centered cubic form of the bismuth oxide and thus contributes to the more substantial, lasting property improvement. Thus the process is composition dependent.

Figure 7:
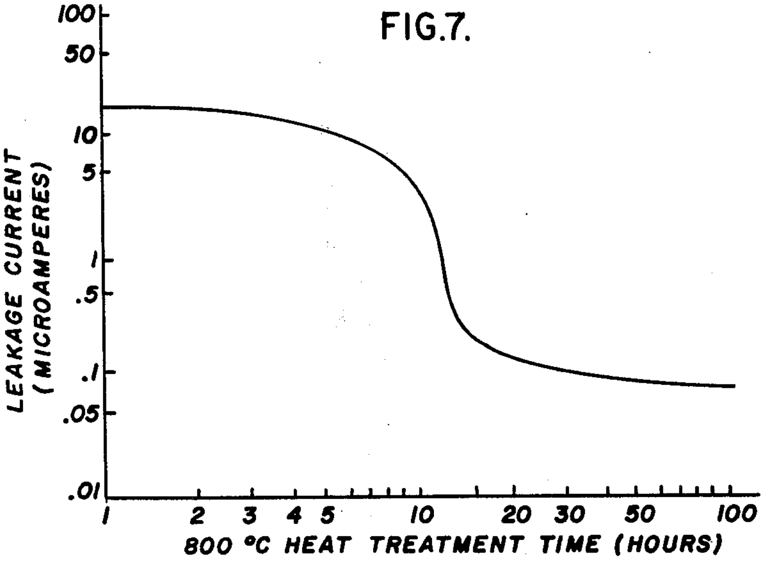
FIG. 7 is a graph illustrating the effect of the duration of the heat treatment on the leakage current.

Referring now to FIG. 7, there is shown a graph of leakage current versus time for a heat treatment at 800° C. The devices used to generate the data for FIG. 7 were prepared in accordance with Example 2 above. It will be appreciated from an observation of FIG. 6 that the optimum heat treatment temperature for the devices prepared in accordance with Example 2 is approximately 800° C. Thus, that temperature was selected for FIG. 7. Observation of FIG. 7 shows that the most dramatic reduction in leakage current occurs after 10 to 15 hours of heat treatment and that heating beyond about 20 hours provides little improvement.

With respect to the devices manufactured in accordance with Example 1, no substantial difference was found between a heat treatment for 26 hours at 600° C. and a heat treatment for 66 hours at 600° C. Furthermore, no substantial difference was found between a heat treatment for 26 hours at 800° C. and a heat treatment for 66 hours at 800° C.

Tests showed that heat treating for a longer period of time at a lower temperature does not improve the device's properties.

This data is consistent with a phase transformation explanation of the property improvement. Specifically, FIG. 7 indicates there is a nucleation period of about 10 hours followed by a rapid rate of phase change which is substantially complete in a few hours.

Figure 8:
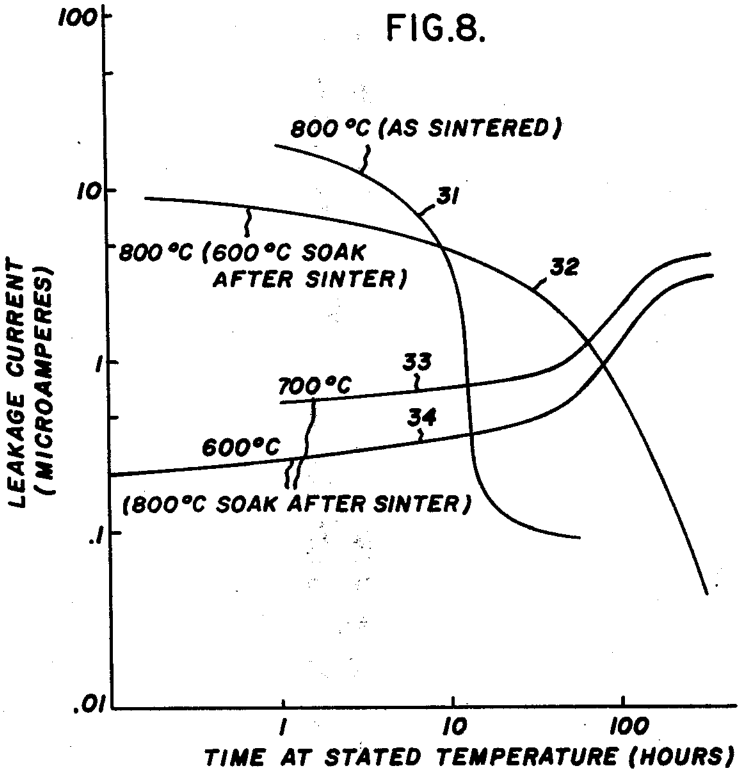
FIG. 8 is a graph illustrating the effects of the prior thermal history of a varistor on the results which will be obtained by practicing the subject heat treatment.

Referring now to FIG. 8, there is shown a graph indicating leakage currents of different groups of devices that were subjected to different treatments. The devices were manufactured in accordance with the steps set forth in Example 2. Each of the four curves in the graph of FIG. 8 has written adjacent thereto a temperature. The abscissa of FIG. 8 indicate the time required at the stated temperature to provide a device with the leakage current indicated. Also associated with each curve in FIG. 8 is a parenthetical phrase which is indicative of the thermal history of the samples.

Referring first to the curve 31, there is shown the leakage current of varistors heat treated at 800° C. after sintering. Actually, the curve 31 is a reproduction of FIG. 7. It is reproduced in FIG. 8 for ease of comparison.

Turning now to the curve 32 in FIG. 8, there is indicated leakage current which will be obtained by heat treating a varistor body at 800° C. after the body has previously been heat treated or soaked at 600° C. after the sintering process. It will be observed that it takes longer for the leakage current to reduce at 800° C. if there was a prior heat treatment at 600° C. The Applicant believes that this occurs because after sintering the bismuth oxide present in the varistor is in several different forms. It is believed that there is some body centered cubic bismuth oxide in the device as sintered. Heat treating at 800° C. for 10 to 15 hours converts the remainder of the bismuth oxide to body centered cubic as indicated by the curve 31. However, it is believed that a 600° soak converts substantially all the bismuth oxide to some other phase. Consequently, a longer time is required to convert substantially all, or at least a sufficient amount of, the bismuth oxide to the body centered cubic phase.

The Applicant has further discovered that if devices are heat treated in accordance with the subject invention and later heat treated for an extended period of time at a temperature which is outside the preferred range, the devices degrade. Curves 33 and 34 in FIG. 8 illustrate the leakage currents of devices manufactured in accordance with the disclosure herein and heat treated at 800° C. when they are later soaked at 600° or 700°. It is observed that at approximately 50 to 100 hours, a substantial increase in leakage current occurs. The Applicant attributes this to a conversion of the body centered cubic bismuth oxide which was formed during the 800° heat treatment to some different phase of bismuth oxide.

One point should be realized from the curves 33 and 34. That is, to eliminate the benefits obtained by the Applicant's heat treatment process requires a subsequent heat treatment at a different temperature for a very extended period of time, such as in excess of 50 hours. Thus, any later processing steps, such as metallization and encapsulation which may be at an elevated temperature outside of the preferred range, are typically of such a short time duration that there is no significant affect on the performance of the heat treated devices. Similarly, since several hours at an elevated temperature outside the preferred range appears to have little affect on the devices, the rate of cooling after heat treating does not appear critical. It is felt, however, that quenching directly from the heat treatment temperatures should be avoided because such a thermal shock may set up undesirable stresses in the body. One cooling cycle which has been found to work well is to cool at a rate of 100 to 200 degrees per hour until a temperature in the range of 400 to 500° C. is reached. Then, the devices can be air quenched.

It should be realized that leakage current is not the only property of the devices affected by the heat treatment. The varistor voltage increases slightly with continued heat treating as will be explained below and the alpha of the devices is increased.

EXAMPLE 3

Varistors were fabricated in accordance with the procedure described in Example 2 above. They exhibited the following properties:

Leakage Current—3.2 microamps
Varistor Voltage—103 volts
Alpha—31

Devices prepared in the same manner but heat treated for 16 hours at 820° C. after sintering exhibited the following characteristics:

Leakage Current—0.15 microamps
Varistor Voltage—115 volts
Alpha—38

EXAMPLE 4

Samples were prepared in accordance with Example 2 and after sintering a passivating glass was applied to the varistors and baked on for appoximately 2 hours at 820° C. The devices exhibited the following characteristics:

Leakage Current—0.6 microamps
Varistor Voltage—112 volts
Alpha—32.5

When devices were prepared in the same manner but were also exposed to an additional heat treatment of 16 hours at 820° C. following glassing, they exhibited the following characteristics:

Leakage Current—0.23 microamps
Varistor Voltage—113 volts
Alpha—36

EXAMPLE 5

Devices prepared in accordance with the techniques set forth in Example 2 were glassed and given a heat treatment of 1 hour at 820° C. The devices exhibited the following characteristics:

Leakage Current—2.7 microamps
Varistor Voltage—108 volts
Alpha—24

Samples prepared as above were given an additional heat treatment of approximately 13 hours at 820° C. after glassing and exhibited the following characteristics:

Leakage Current—0.35 microamps
Varistor Voltage—111 volts
Alpha—33

Thus, it will be appreciated that the subject heat treating method also provides a substantial improvement in alpha. Furthermore, the varistor voltage is increased slightly by the subject heat treatment.

Figure 9:
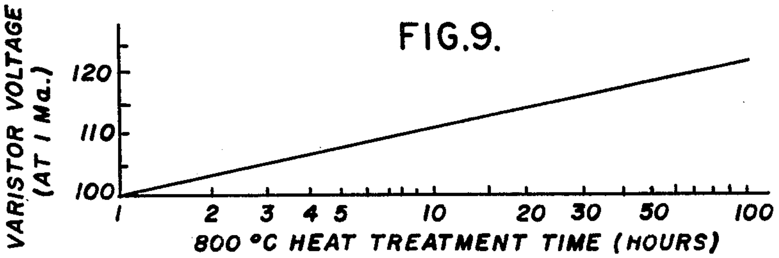
FIG. 9 illustrates the effect of the heat treatment on varistor voltage.

Referring now to FIG. 9, there is shown a graph of varistor voltage increase beginning with a nominally 100 volt device prepared in accordance with the technique described in Example 2.

It is believed by the Applicant that the extended heat treatment disclosed herein makes the devices more uniform due to diffusion. Thus, in other words, while the Applicant believes that the primary benefit obtained by his heat treatment process stems from the phase transformation of the bismuth oxide, he also believes that there is some minor improvement obtained due to diffusion.

It should be noted that the improved properties remain better vis-a-vis non heat treated devices following such tests as load life and pulse testing.

Finally, it should be stressed that, as stated above, the heat treatment process is somewhat composition dependent. Thus, as variators with different formulations are manufactured, the times required for heat treatment and preferred heat treatment temperatures may vary. However, they are expected to stay within or at least near the general ranges outlined above.

Furthermore, certain compositions will be benefited more by the heat treatment than other compositions. However, these are only differences in degree. It is the Applicant's belief that any metal oxide varistor composition including bismuth oxide will benefit from an appropriate heat treatment as disclosed herein.

In view of the foregoing, many modifications and variations of the subject invention will be apparent to those skilled in the art. It is to be understood, therefore, that this invention can be practiced otherwise than as specifically described.

What is claimed is:

1. A method for making metal oxide varistor bodies comprising:

combining a zinc oxide base material with a small amount of a plurality of preselected additives in particulate form to provide a final mixture, at least one of said additives being bismuth oxide;

pressing and sintering a portion of such final mixture to provide a fused body;

heat treating said fused body after said sintering by maintaining said body at a temperature of between about 750° C. and 1200° C. for a time of at about ten hours or more to significantly reduce the leakage current as well as to increase the alpha of said body.

2. The method of claim 1 wherein said heat treating comprises heat treating said fused body by maintaining said body at a substantially constant temperature in the range of about 800° C. to 1200° C.

3. The method of claim 2 wherein the leakage current is reduced by at least a factor of 2.

4. The method of claim 3 wherein said heat treatment step comprises maintaining said body between about 800° C. and 1200° C. during the cool down portion of the sintering cycle.

5. A method for making metal oxide varistor bodies comprising:

combining a zinc oxide base material with a small amount of a plurality of preselected additives in particulate form to provide a final mixture, at least one of said additives being bismuth oxide;

pressing and sintering a portion of said final mixture to provide a fused body;

cooling said fused body to a temperature substantially less than 750° C.;

heat treating said fused body by reheating said body to a temperature in the range of about 750° C. to 1200° C. for a time of about ten hours or more sufficient to significantly reduce the leakage current of said body as well as to significantly increase the alpha.

6. The method of claim 5 wherein said leakage current is reduced by at least a factor of 2.

7. A method for making metal oxide varistor bodies comprising:

combining a zinc oxide base material with a small amount of a plurality of preselected additives in particulate form to provide a final mixture, at least one of said additives being bismuth oxide;

pressing and sintering a portion of such final mixture to provide a fused body;

heat treating said fused body by maintaining said body at a temperature of between about 750° C. and 1200° C. for a time sufficient to significantly increase the alpha of said body.

8. The method of claim 7 wherein said heat treating comprises heat treating said fused body by maintaining said body at a substantially constant temperature in the range of about 750° C. to 1200° C.

9. The method of claim 8 wherein said heat treating comprises heating treating for at least ten hours.

10. The method of claim 9 wherein said pressing and sintering step includes a cooling step and wherein said heat treating comprises maintaining said fused body at said constant temperature during said cooling operation.

11. The method of claim 9 wherein said alpha is increased by at least a factor of 2.

12. The method of claim 11 wherein said pressing and sintering step includes a cooling step and wherein said heat treating comprises maintaining said fused body at said constant temperature during a portion of said cooling step.

13. A method for making metal oxide varistor bodies comprising:

combining a zinc oxide base material with a small amount of a plurality of preselected additives in particulate form to provide a final mixture, at least one of said additives being bismuth oxide;

pressing and sintering a portion of said final mixture to provide a fused body;

cooling said fused body;

heat treating said fused body by reheating said body to a temperature in the range of about 750° C. to 1200° C. for a time sufficient to significantly increase the alpha of said body.

14. The method of claim 13 wherein said alpha is increased by at least a factor of 2.

15. The method of claim 13 wherein said reheating comprises reheating said body for at least ten hours.

16. The method of claim 15 wherein said alpha is increased by at least a factor of 2.

17. The method of claim 13 wherein said heat treating comprises reheating said fused body to a substantially constant temperature in the range of between about 750° C. and 1200° C.

18. A method for making metal oxide varistor bodies comprising:

combining a zinc oxide base material with a small amount of a plurality of preselected additives in particulate form to provide a final mixture, at least one of said additives being bismuth oxide;

pressing and sintering a portion of such final mixture to provide a fused body;

heat treating said fused body by maintaining said body at a temperature of between about 750° C. and 1200° C. for a time sufficient to cause a significant portion of the bismuth oxide in said body to convert to a body centered cubic phase.

19. The method of claim 18 wherein said heat treating comprises maintaining said body at a substantially constant temperature in said range.

20. The method of claim 18 wherein said heat treating comprises maintaining said body at said temperature for a period in excess of ten hours.

21. The method of claim 20 wherein said heat treating comprises maintaining said temperature at a substantially constant level in the range of between about 750° C. and 1200° C.

22. The method of claim 20 wherein substantially all of said bismuth oxide in said body is converted to a body-centered cubic phase.

23. The method of claim 21 wherein substantially all of said bismuth oxide in said body is converted to a body-centered cubic phase.

24. The method of claim 20 wherein said pressing and sintering step includes a cooling step and wherein said heat treating comprises maintaining said body in said range during said cooling step.

25. A method for making metal oxide varistor bodies comprising:

combining a zinc oxide base material with a small amount of a plurality of preselected additives in particulate form to provide a final mixture, at least one of said additives being bismuth oxide;

pressing and sintering a portion of said final mixture to provide a fused body;

cooling said fused body;

heat treating said fused body by reheating said body to a temperature in the range of about 750° C. to 1200° C. for a time sufficient to cause a significant portion of the bismuth oxide in said body to convert to a body-centered cubic phase.

26. The method of claim 25 wherein substantially all of said bismuth oxide is converted to the body-centered cubic phase.

27. The method of claim 25 wherein said heat treating comprises heat treating said fused body by heating it to a preselected elevated temperature within said temperature range for a time in excess of about ten hours.

28. The method of claim 25 wherein said heat treating comprises heat treating said fused body by maintaining said body at a substantially constant temperature in the range of about 750° C. to 1200° C.

29. The method of claim 27 wherein substantially all of said bismuth oxide is converted to the body-centered cubic phase.

30. The method of claim 1 wherein said additives consist essentially of a mixture of the the oxides of cobalt, manganese and titanium and said step of heat treating is carried out at a temperature in the range of about 750° C. to 850° C.

31. The method of claim 1 wherein said additives consist essentially of a mixture of the oxides of manganese, cobalt, tin, antimony and boron, said additives also comprising barium carbonate and said step of heat treating is carried out at a temperature in the range of about 800° C. to 1150° C.

32. The method of claim 31 wherein said step of heat treating is carried out at a temperature in the range of about 800° C. to 1100° C.

33. The method of claim 4 wherein the varistor voltage of said varistor is increased by said step of heat treating.

* * * * *

UNITED STATES PATENT OFFICE
CERTIFICATE OF CORRECTION

PATENT NO. : 4,165,351

DATED : Aug. 21, 1979

INVENTOR(S) : John E. May

It is certified that error appears in the above-identified patent and that said Letters Patent are hereby corrected as shown below:

Claim 31, lines 3 and 4, delete "said additives also comprising" and add -- and --.

Signed and Sealed this

*Thirteenth* Day of *November 1979*

[SEAL]

*Attest:*

RUTH C. MASON
*Attesting Officer*

LUTRELLE F. PARKER
*Acting Commissioner of Patents and Trademarks*